United States Patent
Tonkinson et al.

(10) Patent No.: US 7,363,716 B1
(45) Date of Patent: Apr. 29, 2008

(54) IMAGE PROJECTION AND LASER LEVEL DEVICE FOR LAYOUT DESIGN OF WALL-MOUNTED ITEMS

(76) Inventors: Amanda Tonkinson, 4842 E. Desertview Dr., Phoenix, AZ (US) 85044; Charles Tonkinson, 4842 E. Desertview Dr., Phoenix, AZ (US) 85044

( * ) Notice: Subject to any disclaimer, the term of this patent is extended or adjusted under 35 U.S.C. 154(b) by 0 days.

(21) Appl. No.: 11/637,966

(22) Filed: Dec. 13, 2006

(51) Int. Cl.
*G01C 15/00* (2006.01)
(52) U.S. Cl. ........................................ 33/286
(58) Field of Classification Search ............... 33/286
See application file for complete search history.

(56) References Cited

U.S. PATENT DOCUMENTS

| | | | |
|---|---|---|---|
| 5,784,168 A | 7/1998 | Ophey et al. | |
| 6,360,446 B1 * | 3/2002 | Bijawat et al. | 33/451 |
| 6,735,879 B2 * | 5/2004 | Malard et al. | 33/286 |
| D491,080 S | 6/2004 | Wu | |
| 6,763,598 B1 * | 7/2004 | Chen | 33/286 |
| 6,880,259 B1 | 4/2005 | Schultz | |
| 7,069,661 B2 * | 7/2006 | Liao | 33/286 |
| 2001/0034668 A1 | 10/2001 | Whitworth | |
| 2005/0005462 A1 * | 1/2005 | Heger et al. | 33/286 |
| 2005/0172502 A1 | 8/2005 | Sergyeyenko et al. | |
| 2005/0204570 A1 | 9/2005 | Bascom et al. | |
| 2005/0270532 A1 | 12/2005 | Malard et al. | |
| 2006/0021237 A1 * | 2/2006 | Marshall et al. | 33/290 |
| 2006/0028709 A1 | 2/2006 | Cho et al. | |
| 2006/0044532 A1 | 3/2006 | Black, Jr. | |
| 2006/0059699 A1 | 3/2006 | Krantz et al. | |
| 2006/0112576 A1 * | 6/2006 | Lu | 33/286 |

* cited by examiner

Primary Examiner—Christopher W Fulton

(57) ABSTRACT

The present invention relates to a handheld electronic device that would project images on a wall to provide placement patterns for pictures, mirrors, and other wall-mounted items. The device also integrates a laser level for leveling a series of items. Computer chips can be inserted into the housing to enable various patterns to be projected. The invention is located at some distance from the wall either another wall, a table, etc. If the invention is placed on an opposing wall, the housing of the invention would be mounted by an adhesive or a series of pins.

2 Claims, 3 Drawing Sheets

IMAGE PROJECTION AND LASER LEVEL DEVICE FOR LAYOUT DESIGN OF WALL-MOUNTED ITEMS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to a self-contained device designed to project various shapes onto a wall in order to design a layout for pictures to be hung on the wall. The device also provides a laser level feature that would enable the user to project a laser line level across a wall where needed.

B. Prior Art

The Whitworth Patent Application Publication (U.S. Patent Pub. No. 2001/0034668) is directed to a method for viewing images which could be used to simulate the appearance of installed paint, carpet, or wallpaper.

The Schultz Patent (U.S. Pat. No. 6,880,259) discloses a compact picture leveling template where the design of the device would allow the user to arrange picture frames or any objects that could be mounted on a wall in a preferred arrangement on a vertical surface of any size or slope and also includes multiple leveling guides.

The Ophey et al. Patent (U.S. Pat. No. 5,784,168) discloses a picture display system which is known as laser TV which an image is directly written on a projection screen or on a wall functioning as such by means of a scanning laser beam.

The Cho et al. Patent Application Publication (U.S. Pub. No. 2006/0028709) discloses a two-dimensional image projector implemented within a small portable electronic device.

The Malard et al. Patent Application Publication (U.S. Pub. No. 2005/0270532) discloses a self-contained line generating device which uses a laser diode and a lens to project a fan-shaped beam of visible light.

The Bascom et al. Patent Application Publication (U.S. Pub. No. 2005/0204570) discloses an optical leveling, plumbing and angle-calibrating instrument.

The Sergyeyenko et al. Patent Application Publication (U.S. Pub. No. 2005/0172502) discloses a laser level projection apparatus.

The Krantz et al. Patent Application Publication (U.S. Pub. No. 2006/0059699) discloses a spherically rotatable support for a light image projector having a level indicator whereupon a projected light image may be successively stepped across a long wall while maintaining its level condition.

The Wu Design Patent (U.S. Pat. No. Des. 491,080) illustrates a design for a laser level apparatus.

The Black, J R Patent Application Publication (U.S. Pub. No. 2006/0044532) discloses an image display device capable of projecting an image from a single, fixed image representation of an image.

BRIEF SUMMARY OF THE INVENTION

The present invention relates to a handheld electronic device that would project images on a wall to provide placement patterns for pictures, mirrors, and other wall-mounted items. The device also integrates a laser level for leveling a series of items. Computer chips can be inserted into the housing to enable various patterns to be projected. The invention is located at some distance from the wall like another wall, a table, etc. If the invention is placed on an opposing wall, the housing of the invention would be mounted by an adhesive or a series of pins.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
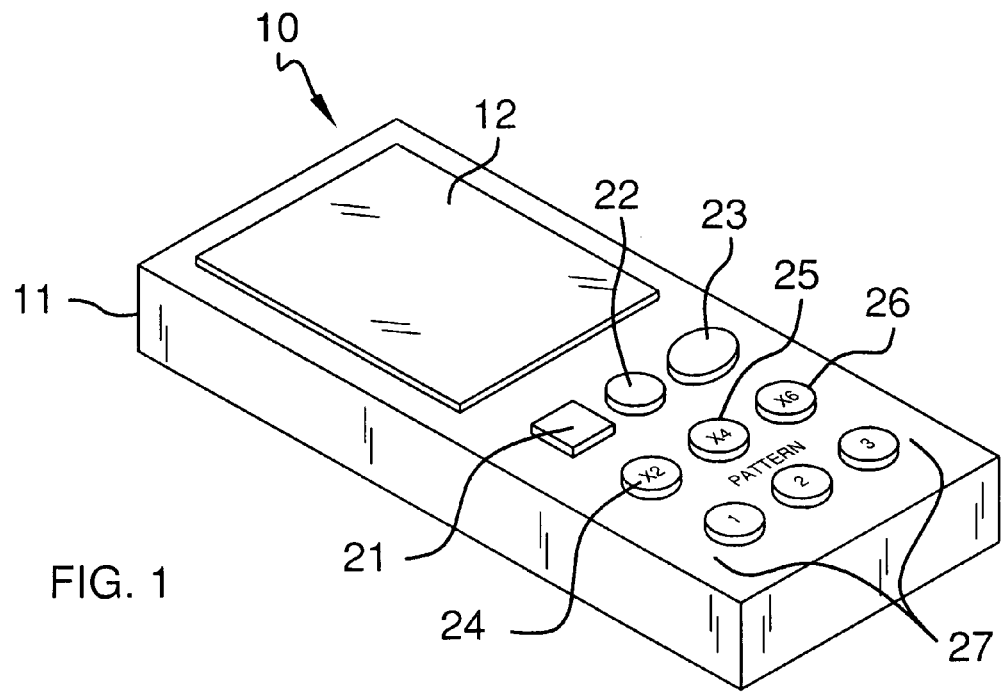
FIG. 1 illustrates an isometric view of the top side of the invention.
Figure 2:
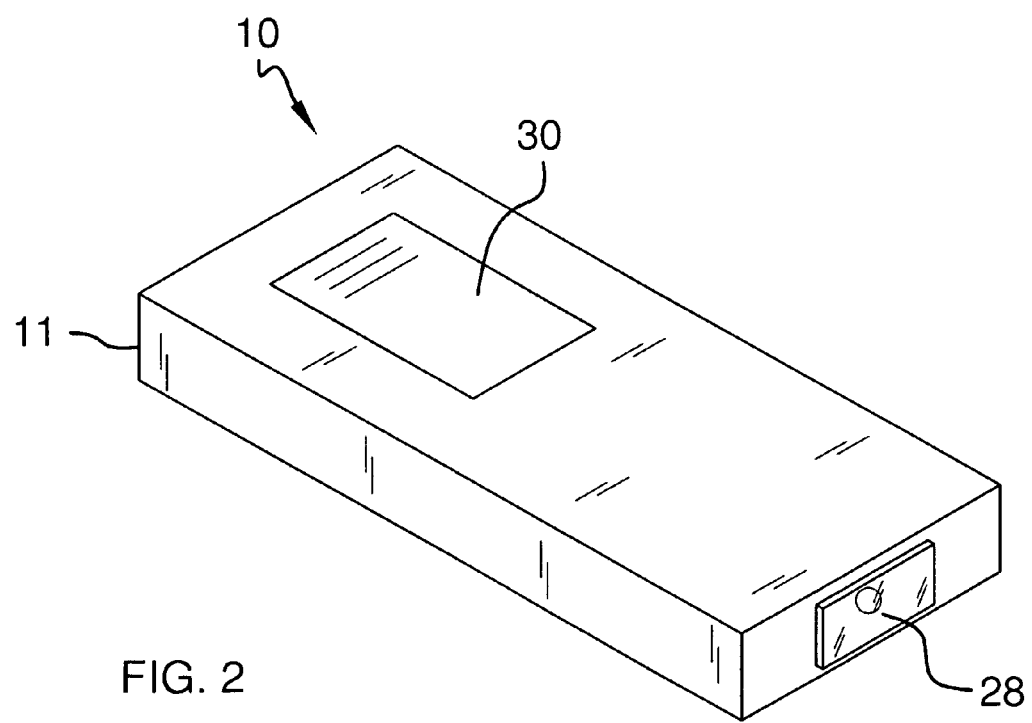
FIG. 2 illustrates an isometric view of bottom side of the invention.
Figure 3:
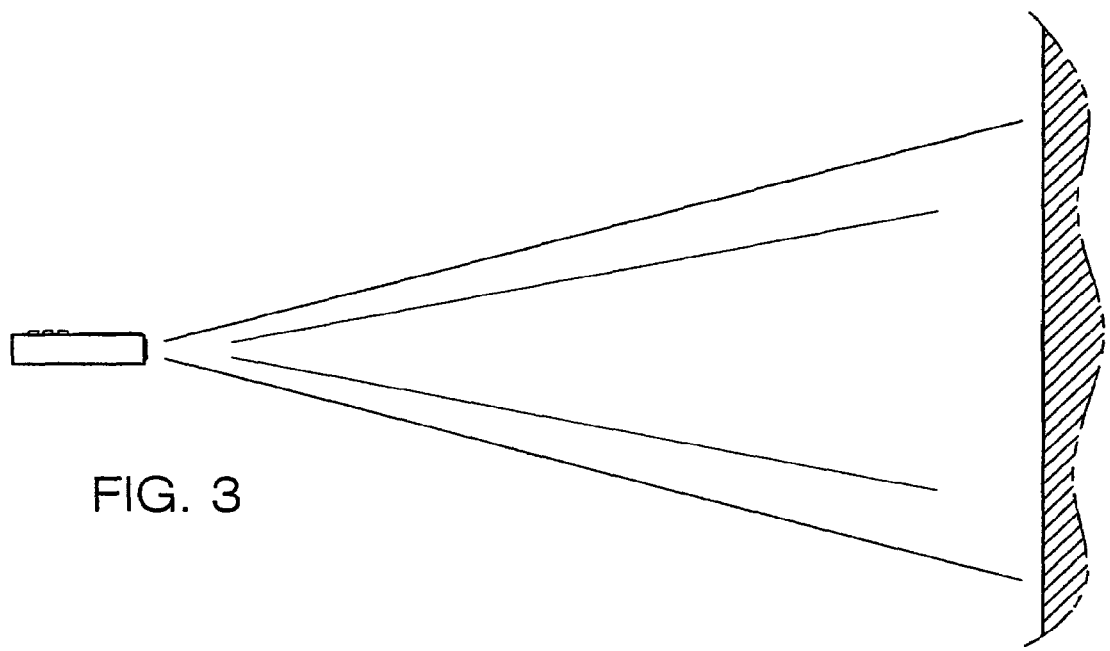
FIG. 3 illustrates a side view of the invention in use.
Figure 4:
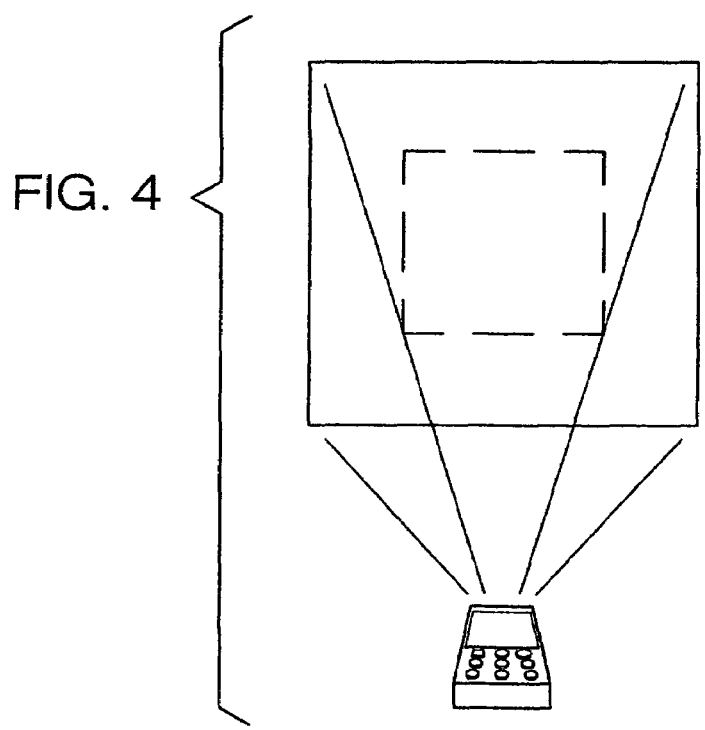
FIG. 4 illustrates a rear-sided view of the invention projecting a square onto an opposing wall.
Figure 5:
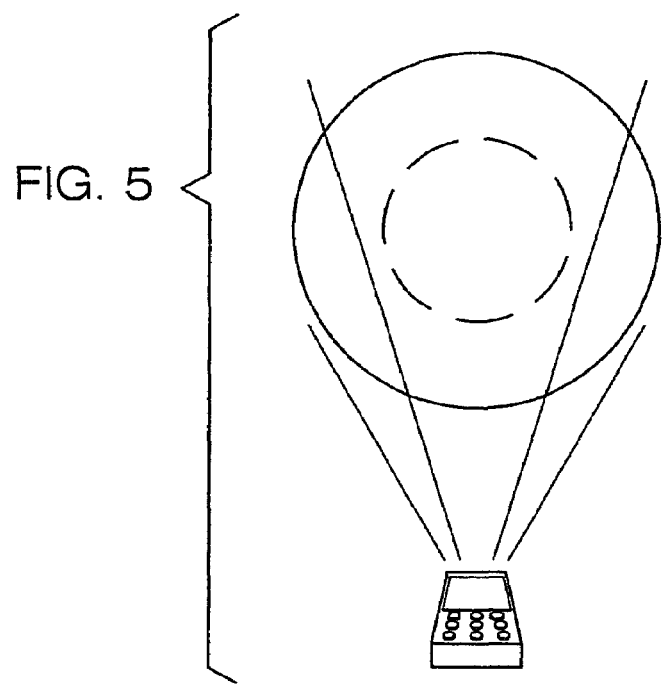
FIG. 5 illustrates a rear-sided view of the invention projecting a circle onto an opposing wall.
Figure 6:
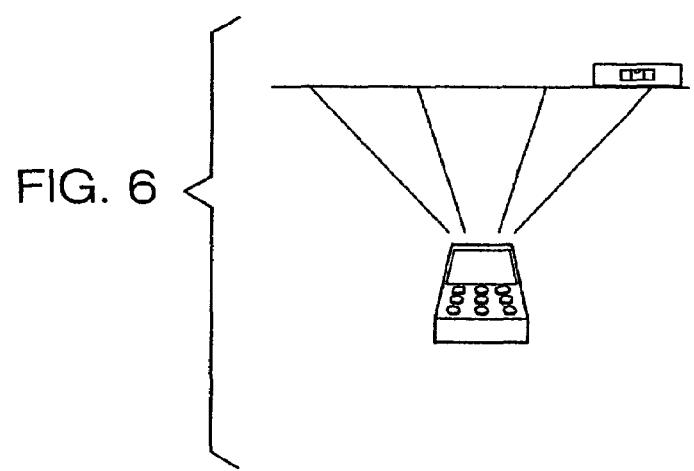
FIG. 6 illustrates a rear-sided view of the invention projecting a laser-line level onto an opposing wall.

Detailed reference will now be made to the preferred embodiment of the present invention, examples of which are illustrated in FIGS. 1-6.

An invention 10 has a housing 11 with a liquid crystal display 12 that provides the user with an anticipated display of what the invention 10 will project. The housing 11 contains a square-shaped button 21 for projecting squares onto a wall. The housing 11 contains a circle-shaped button 22 for projecting circles onto a wall. The housing 11 contains an oval-shaped button 23 for projecting an oval shape onto a wall. The housing has a 2X button 24, 4X button 25, and an 8X button 26 for multiplying the image by the rate specified on the button. The housing 11 has a plurality of pattern buttons 27 that can be changed by inserting different microchips with predetermined designs into the chip insertion point 30 on the backside of the housing 11. At a side of the housing 11 is a projection laser 28 that is responsible for emitting all of the laser-light required for a laser-line level as well as for the shapes to be projected. Alternatively, the invention 10 may be outfitted with a combination laser light that projects a laser line level and light emitting diode that projects the images onto the wall.

The invention 10 is used by locating a wall to display an image onto. The user then finds a stable surface like an opposing wall, a table, etc., to support the invention 10. An adhesive or a series of pins maybe used to support the invention 10 if the user is hanging the invention on an opposing wall. Once the invention 10 is on a stable surface, simply push a button for the desired image, which will project the selected image onto the wall. Once an image is projected onto a wall, the user may desire the image to be larger, which can be accomplished by pressing down on one of the magnifying buttons 24-26.

The invention claimed is:

1. An image projecting device comprising:
   (a) a housing;
   (b) a display;
   (c) a plurality of shape buttons that when depressed illuminates the desired shape;
   (d) a plurality of multiplying buttons;
   wherein when one of the multiplying buttons is depressed in conjunction with one of the shape buttons, a light image projected onto a wall will be multiplied in size by the factor indicated on the button; and
   (e) a light source for projecting a light in the shape of the corresponding shape button onto a wall; and
   wherein the display provides the end user with a display of the projected output created by the depression of the selected button.

2. An image projecting device comprising:
   (a) a housing;
   (b) a display;
   (c) a plurality of shape buttons that when depressed illuminates the desired shape;
   (d) a plurality of pattern buttons are added;
   wherein upon depression of one of the pattern buttons, a pre-determined pattern of images are projected,
   wherein the patter of images comprises squares, circles, ovals, and triangles;
   wherein each pattern includes a plurality of combinations comprising different shapes and/or sizes;
   wherein each pattern button is controlled by a microchip that is inserted into the housing; and
   (e) a plurality of multiplying buttons;
   wherein when one of the multiplying buttons is depressed in conjunction with one of the shape buttons, a light image projected onto a wall will be multiplied in size by the factor indicated on the button; and
   (f) a light source for projecting a light in the shape of the corresponding shape button onto a wall; and
   wherein the display provides the end user with a display of the projected output created by the depression of the selected button.

* * * * *